US011655404B2

(12) United States Patent
Desroches et al.

(10) Patent No.: US 11,655,404 B2
(45) Date of Patent: May 23, 2023

(54) SEALANT COMPOSITION

(71) Applicant: DOW SILICONES CORPORATION, Midland, MI (US)

(72) Inventors: Maude Desroches, Midland, MI (US); Timothy Lueder, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/786,398

(22) PCT Filed: Dec. 17, 2020

(86) PCT No.: PCT/US2020/065475
§ 371 (c)(1),
(2) Date: Jun. 16, 2022

(87) PCT Pub. No.: WO2021/133622
PCT Pub. Date: Jul. 1, 2021

(65) Prior Publication Data
US 2023/0094559 A1 Mar. 30, 2023

Related U.S. Application Data

(60) Provisional application No. 62/952,522, filed on Dec. 23, 2019.

(51) Int. Cl.
*C09J 183/08* (2006.01)
*C09J 11/08* (2006.01)
*C09J 11/06* (2006.01)
*C09J 5/00* (2006.01)
*C08K 13/06* (2006.01)
*C08G 77/38* (2006.01)
*C08G 77/08* (2006.01)
*C08G 77/20* (2006.01)
*C09J 11/04* (2006.01)
*C08K 5/5419* (2006.01)
*C08K 5/544* (2006.01)
*C08K 9/00* (2006.01)

(52) U.S. Cl.
CPC ............ *C09J 183/08* (2013.01); *C08G 77/08* (2013.01); *C08G 77/20* (2013.01); *C08G 77/38* (2013.01); *C08K 13/06* (2013.01); *C09J 5/00* (2013.01); *C09J 11/04* (2013.01); *C09J 11/06* (2013.01); *C08K 5/544* (2013.01); *C08K 5/5419* (2013.01); *C08K 9/00* (2013.01); *C08K 2201/005* (2013.01); *C08K 2201/006* (2013.01); *C08K 2201/011* (2013.01); *C08K 2201/014* (2013.01); *C09J 2483/00* (2013.01)

(58) Field of Classification Search
CPC .......... C09J 183/08; C09J 11/08; C09J 11/06; C09J 5/00; C08K 13/06; C08G 77/38; C08G 77/08
USPC ....................................................... 523/209
See application file for complete search history.

(56) References Cited

U.S. PATENT DOCUMENTS

| 3,635,887 | A | 1/1972 | Polmanteer |
| 3,996,184 | A | 12/1976 | Klosowski |
| 4,515,932 | A | 5/1985 | Chung |
| 4,962,152 | A | 10/1990 | Leempoel |
| 5,017,628 | A | 5/1991 | Dietlein |
| 5,053,442 | A | 10/1991 | Chu et al. |
| 5,300,608 | A | 4/1994 | Chu et al. |
| 5,519,104 | A | 5/1996 | Lucas |
| 5,674,936 | A | 10/1997 | Lucas |
| 6,162,756 | A | 12/2000 | Friebe et al. |
| 6,562,931 | B1 | 5/2003 | Knepper |
| 8,067,508 | B2 | 11/2011 | Braun et al. |
| 11,168,213 | B2 | 11/2021 | Huang et al. |
| 2003/0216536 | A1 | 11/2003 | Levandoski et al. |
| 2005/0288415 | A1 | 12/2005 | Beers et al. |
| 2006/0074183 | A1* | 4/2006 | Sakamoto ............ C09D 183/04 524/731 |
| 2007/0237912 | A1 | 10/2007 | Correia |
| 2010/0099793 | A1 | 4/2010 | Wunder |
| 2010/0139843 | A1 | 6/2010 | DeCato |
| 2010/0317796 | A1 | 12/2010 | Huang et al. |
| 2013/0023602 | A1 | 1/2013 | Dorman |
| 2013/0338289 | A1 | 12/2013 | Jadot et al. |
| 2014/0235812 | A1 | 8/2014 | Brandstadt et al. |

(Continued)

FOREIGN PATENT DOCUMENTS

| CN | 1382183 A | 11/2002 |
| CN | 1597824 A | 3/2005 |

(Continued)

OTHER PUBLICATIONS

Machine assisted English translation of CN102952270A obtained from https://patents.google.com/patent on Aug. 24, 2022, 9 pages.
Machine assisted English translation of CN103396757A obtained from https://patents.google.com/patent on Aug. 24, 2022, 9 pages.
Machine assisted English translation of CN103408941A obtained from https://patents.google.com/patent on Aug. 24, 2022, 8 pages.
Machine assisted English translation of CN104497579B obtained from https://patents.google.com/patent on Aug. 24, 2022, 11 pages.
Machine assisted English translation of CN1597824A obtained from https://patents.google.com/patent on Aug. 24, 2022, 8 pages.

(Continued)

*Primary Examiner* — Deve V Hall
(74) *Attorney, Agent, or Firm* — Warner Norcross + Judd LLP

(57) ABSTRACT

A one-part low modulus room temperature vulcamsable (RTV) silicone composition comprising a titanate and/or zirconate catalyst which cures to a low modulus silicone elastomer which has a good adhesion profile and may be used as a non-staining (clean) sealant having high movement capability which compositions contains an aminosilane adhesion promoter having two hydroxyl or hydrolysable groups per molecule in an amount of 0.1-3.75% by weight of the composition.

16 Claims, No Drawings

(56) References Cited

U.S. PATENT DOCUMENTS

| | | |
|---|---|---|
| 2014/0288222 A1 | 9/2014 | Yano et al. |
| 2015/0031841 A1 | 1/2015 | Horstman et al. |
| 2015/0045519 A1 | 2/2015 | Rutz et al. |
| 2015/0159051 A1 | 6/2015 | Kohl et al. |
| 2016/0340548 A1 | 11/2016 | Gubbels et al. |
| 2017/0101564 A1 | 4/2017 | Choffat |
| 2018/0258316 A1 | 9/2018 | Lucas |
| 2021/0054202 A1* | 2/2021 | Dimitrova ................ C08K 9/08 |
| 2021/0147682 A1* | 5/2021 | Dimitrova ................ C08K 9/06 |

FOREIGN PATENT DOCUMENTS

| | | |
|---|---|---|
| CN | 1597828 A | 3/2005 |
| CN | 1654584 A | 8/2005 |
| CN | 102952270 A | 3/2013 |
| CN | 103298888 A | 9/2013 |
| CN | 103396757 A | 11/2013 |
| CN | 103408941 A | 11/2013 |
| CN | 105849213 A | 8/2016 |
| CN | 104497579 B | 2/2017 |
| EP | 38221 B1 | 11/1985 |
| EP | 802222 A1 | 10/1997 |
| EP | 802233 A2 | 10/1997 |
| EP | 1043356 A1 | 10/2000 |
| EP | 1238005 B1 | 9/2004 |
| WO | 2013130574 A1 | 9/2013 |
| WO | 2019024430 A1 | 2/2019 |
| WO | 2019200579 A1 | 10/2019 |
| WO | WO-2019190775 A1 * | 10/2019 ............ C08G 77/16 |
| WO | WO-2019190776 A1 * | 10/2019 ............ C08G 77/16 |

OTHER PUBLICATIONS

Machine assisted English translation of CN1654584A obtained from https://patents.google.com/patent on Aug. 24, 2022, 9 pages.

Brook, M., "Silicon in Organic, Organometallic and Polymer Chemistry", John Wiley & Sons, Inc. (2000), pp. 284-287.

International Search Report for PCT/US2020/065475 dated Apr. 4, 2021, 3 pages.

International Search Report for PCT/CN2019/125816 dated Sep. 21, 2020, 3 pages.

International Search Report for PCT/CN2019/125817 dated Jul. 29, 2020, 3 pages.

International Search Report for PCT/CN2019/125815 dated Sep. 22, 2020, 3 pages.

International Search Report for PCT/CN2019/125814 dated Jul. 29, 2020, 3 pages.

International Search Report for PCT/CN2019/125820 dated Sep. 2, 2020, 4 pages.

Noll, W., Chemistry and Technology of Silicones, Academic Press Inc., New York, (1968) pp. 396-399.

Machine assisted English translation of CN1597828A obtained from https//patents google.com/patent on Jan. 12, 2023, 7 pages.

* cited by examiner

SEALANT COMPOSITION

CROSS-REFERENCE TO RELATED APPLICATIONS

This application is the U.S. National Stage of International Application No. PCT/US2020/065475 filed on 17 Dec. 2019, which claims priority to U.S. Provisional Application No. 62/952,522 filed on 23 Dec. 2019, the content of which is incorporated herein by reference.

FIELD OF THE INVENTION

This relates to a one-part low modulus room temperature vulcanisable (RTV) silicone composition comprising a titanate and/or zirconate catalyst and an aminosilane adhesion promoter having two hydroxyl or hydrolysable groups per molecule which cures to a low modulus silicone elastomer which has a good adhesion profile and may be used as a non-staining (clean) sealant having high movement capability.

BACKGROUND OF THE INVENTION

Room temperature vulcanizable (RTV) silicone rubber compositions (hereinafter referred to as "RTV compositions") are well known. Generally, such compositions comprise an —OH end-blocked diorganopolysiloxane polymer or an alkoxy end-blocked polydiorganosiloxane which may have an alkylene link between the end silicon atoms and one or more suitable cross-linking agents designed to react with the —OH and/or alkoxy groups and thereby cross-link the composition to form an elastomeric sealant product. One or more additional ingredients such as catalysts, reinforcing fillers, non-reinforcing fillers, adhesion promotors diluents (e.g. plasticisers and/or extenders), chain extenders, flame retardants, solvent resistant additives, biocides and the like are often also incorporated into these compositions as and when required. They may be one-part compositions or multiple-part compositions. One-part compositions are generally stored in a substantially anhydrous form to prevent premature cure. The main, if not sole source, of moisture in these compositions are the inorganic fillers, e.g. silica when present. Said fillers may be rendered anhydrous before inter-mixing with other ingredients or water/moisture may be extracted from the mixture during the mixing process to ensure that the resulting sealant composition is substantially anhydrous.

Silicone sealant compositions having at least one Si-alkoxy bond, e.g. Si-methoxy bond in the terminal reactive silyl group and having a polydiorganosiloxane polymeric backbone are widely used for sealants in the construction industry because they have good adhesion, and weather resistance, and the like. Such sealants are often required to provide low-modulus cured products capable of being highly stretched by a small amount of stress. The construction industry also prefers one-component compositions to negate the need for mixing ingredients before application and compositions with excellent workability.

Low modulus room temperature vulcanisable (RTV) silicone compositions can be used in a wide variety of applications. For example, they have achieved considerable commercial success as highway sealants and more recently in the building construction industry. In certain applications, such as the construction of high-rise buildings, it is desirable and often critical to utilize low modulus sealants and/or adhesives for adhering window panes to the frames (metal or otherwise) of a building structure. The low modulus property enables the resulting cured silicone elastomers to easily compress and expand with building movement due to winds and the like without causing cohesive or adhesive failure.

Indeed recent architectural trends towards "mirrored" high rise buildings, that is, high rise buildings where the exterior of the building has the appearance of being a large mirror, for both aesthetic and energy-saving reasons, generally known as curtain walls, have resulted in there being a great deal of interest in providing suitable low modulus silicone sealants to deliver such effects.

Low modulus sealants typically rely on high molecular weight/chain length polydiorganosiloxane polymers which are end-blocked with reactive groups but have low levels of reactive groups attached to silicon atoms along the polymer chain in order to generate cross-linked elastomeric products with low cross-link densities. Such polymers have often been prepared using chain extension processes for which suitable reactive silanes may be utilised as chain extenders during the curing of the composition. However, the use of such high molecular weight polymers typically results in high viscosity compositions especially when reinforcing fillers are also introduced into the composition.

Reinforcing fillers make important contributions to both the cost and rheology of compositions and to the physical properties of resulting elastomeric materials formed from the composition upon cure, such as, abrasion resistance, tensile and tear strength, hardness and modulus. For example, fine particle fumed silicas are used in compositions from which silicone sealants are made in order to improve strength in the cured elastomer. Inclusion of filler as well as the high molecular weight polymers in a liquid composition leads to stiffening of the composition and a reduction in flowability of the composition, and consequently to a need for increased applied shear during mixing to achieve the desired homogenous mixed state of the composition as greater amounts of filler are used. This can be a major problem in room temperature cure materials which are often sought to be gunnable i.e. applied by means of pushing uncured sealant out of a sealant tube using a sealant gun.

The introduction of unreactive liquid plasticisers/extenders (sometimes referred to as process aids) has been utilised to produce low modulus sealants. They are used as a means of lowering viscosity of uncured compositions. However, once cured the unreactive liquids within the cured sealant may migrate and potentially bleed out of the sealant which, over an extended period of time, can result in the sealant failing and often causes staining and discoloration in/on adjacent substrates.

Another known problem is seen when tin (iv) catalysts are used in the sealant compositions as the resulting elastomers, upon cure, tend to lose the ability to expand and recover as e.g. a building moves due to e.g. weather conditions over extended life times. This type of product cannot follow the expansion and shrinkage as the low-modulus sealants are often found to have lower recovery properties than high-modulus sealants, even though they accommodate more movement.

It is well known to people skilled in the art that alkoxy titanium compounds i.e. alkyl titanates—are suitable catalysts for formulating one component moisture curable silicones (References: Noll, W.; Chemistry and Technology of Silicones, Academic Press Inc., New York, 1968, p. 399, Michael A. Brook, silicon in organic, organometallic and polymer chemistry, John Wiley & sons, Inc. (2000), p. 285). Titanate catalysts have been widely described for their use in skin/diffusion cured one-part condensation curing silicone compositions. Skin or diffusion cure (e.g. moisture/condensation) occurs by the initial formation of a cured skin at the composition/air interface subsequent to the sealant/encapsulant being applied on to a substrate surface. Subsequent to the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core. These compositions are typically used in applications where in use the composition is applied in layers of ≤15 mm. Layers thicker than 15 mm are known to result in uncured material being present in the depth of the otherwise cured elastomer because moisture is very slow to diffuse into very deep sections.

BRIEF SUMMARY OF THE INVENTION

The disclosure herein seeks to provide a one-part low modulus room temperature vulcanisable (RTV) silicone composition, which upon cure provides a sealant with a low modulus e.g. ≤0.45 MPa at 100% elongation, has a good adhesion profile and is non-staining (clean) with respect to porous substrates like granite, limestone, marble, masonry, metal and composite panels.

There is provided herein a one-part condensation curable low modulus room temperature vulcanisable (RTV) silicone composition comprising
(a) an organopolysiloxane polymer having at least two hydroxyl or hydrolysable groups per molecule of the formula

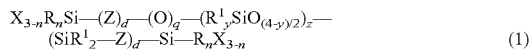

$$X_{3-n}R_nSi\text{—}(Z)_d\text{—}(O)_q\text{—}(R^1{}_y SiO_{(4-y)/2})_z\text{—}(SiR^1{}_2\text{—}Z)_d\text{—}Si\text{—}R_nX_{3-n} \quad (1)$$

in which each X is independently a hydroxyl group or a hydrolysable group, each R is an alkyl, alkenyl or aryl group, each R$^1$ is X group, alkyl group, alkenyl group or aryl group and Z is a divalent organic group;
d is 0 or 1, q is 0 or 1 and d+q=1; n is 0, 1, 2 or 3, y is 0, 1 or 2, and preferentially 2 and z is an integer such that said organopolysiloxane polymer has a viscosity of from 30,000 to 80,000 mPa·s at 25° C., alternatively from 40,000 to 75,000 mPa·s at 25° C., in an amount of from 35 to 60% by weight of the composition;
(b) a hydrophobically treated calcium carbonate reinforcing filler having a surface area of from 2.5 to 12 m$^2$/g and an average particle size of >0.1 μm in an amount of 30 to 60% by weight of the composition;
(c) one or more difunctional silane chain extenders having two hydroxyl or hydrolysable groups per molecule in an amount of from 0.2 to 5.0% by weight of the composition;
(d) a titanate and/or zirconate catalyst in an amount of from 0.2 to 1.0% by weight of the composition;
(e) an aminosilane adhesion promoter having two hydroxyl or hydrolysable groups per molecule in an amount of 0.1-3.75% by weight of the composition, and optionally
(f) one or more silane cross-linkers having at least 3 hydroxyl and/or hydrolysable groups per molecule in an amount of from 0 to 3% by weight of the composition.

There is also provided herein a method of making the above one-part condensation curable low modulus room temperature vulcanisable (RTV) silicone composition by mixing all the ingredients together.

There is also provided herein an elastomeric sealant material which is the cured product of the one-part condensation curable low modulus room temperature vulcanisable (RTV) silicone composition as hereinbefore described.

There is also provided a use of the aforementioned composition as a sealant in the facade, insulated glass, window construction, automotive, solar and construction fields.

There is also provided a method for filling a space between two substrates so as to create a seal therebetween, comprising:
a) providing a one-part condensation curable low modulus room temperature vulcanisable (RTV) silicone composition as hereinbefore described, and either
b) applying the silicone composition to a first substrate, and bringing a second substrate in contact with the silicone composition that has been applied to the first substrate, or
c) filling a space formed by the arrangement of a first substrate and a second substrate with the silicone composition and curing the silicone composition.

DETAILED DESCRIPTION OF THE INVENTION

The concept of "comprising" where used herein is used in its widest sense to mean and to encompass the notions of "include" and "consist of".

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The one-part condensation curable low modulus room temperature vulcanisable (RTV) silicone compositions are preferably room temperature vulcanisable compositions in that they cure at room temperature without heating but may if deemed appropriate be accelerated by heating.

Organopolysiloxane polymer (a) having at least two hydroxyl or hydrolysable groups per molecule has the formula

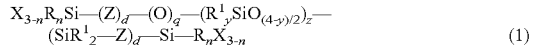

$$X_{3-n}R_nSi\text{—}(Z)_d\text{—}(O)_q\text{—}(R^1{}_y SiO_{(4-y)/2})_z\text{—}(SiR^1{}_2\text{—}Z)_d\text{—}Si\text{—}R_nX_{3-n} \quad (1)$$

in which each X is independently a hydroxyl group or a hydrolysable group, each R is an alkyl, alkenyl or aryl group, each R$^1$ is an X group, alkyl group, alkenyl group or aryl group and Z is a divalent organic group;
d is 0 or 1, q is 0 or 1 and d+q=1; n is 0, 1, 2 or 3, y is 0, 1 or 2, and z is an integer such that said organopolysiloxane polymer (a) has a viscosity of from 30,000 to 80,000 mPa·s at 25° C., alternatively from 40,000 to 75,000 mPa·s at 25° C., in accordance with Corporate test method CTM 0050, which is publicly available, and which is based on ASTM D 1084-16 method B, using a Brookfield HBDV-III Ultra Rheometer equipped with a cone-and-plate geometry using spindle 52.

Each X group of organopolysiloxane polymer (a) may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$.

The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy. When d=1, n is typically 0 or 1 and each X is an alkoxy group, alternatively an alkoxy group having from 1 to 3 carbons, alternatively a methoxy or ethoxy group. In such a case organopolysiloxane polymer (a) has the following structure:

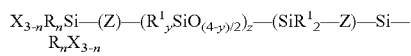

with R, R$^1$, Z, y and z being the same as previously identified above, n being 0 or 1 and each X being an alkoxy group.

Each R is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each R$^1$ is individually selected from the group consisting of X or R with the proviso that cumulatively at least two X groups and/or R$^1$ groups per molecule are hydroxyl or hydrolysable groups. It is possible that some R$^1$ groups may be siloxane branches off the polymer backbone which branches may have terminal groups as hereinbefore described. Most preferred R$^1$ is methyl.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group.

Additionally n is 0, 1, 2 or 3, d is 0 or 1, q is 0 or 1 and d+q=1. In one alternatively when q is 1, n is 1 or 2 and each X is an OH group or an alkoxy group. In another alternative when d is 1 n is 0 or 1 and each X is an alkoxy group.

Organopolysiloxane polymer (a) has a viscosity of from 30,000 to 80,000 mPa·s at 25° C., alternatively from 40,000 to 75,000 mPa·s at 25° C. determined using Corporate test method CTM 0050, which is publicly available, and which is based on ASTM D 1084-16 method B, using a Brookfield HBDV-III Ultra Rheometer equipped with a cone-and-plate geometry using spindle 52, z is therefore an integer enabling such a viscosity, alternatively z is an integer from 300 to 5000. Whilst y is 0, 1 or 2, substantially y=2, e.g. at least 90%, alternatively 95% of R$^1_y$SiO$_{(4-y)/2}$ groups are characterized with y=2.

Organopolysiloxane polymer (a) can be a single siloxane represented by Formula (1) or it can be mixtures of organopolysiloxane polymers represented by the aforesaid formula. Hence, the term "siloxane polymer mixture" in respect to organopolysiloxane polymer (a) is meant to include any individual organopolysiloxane polymer (a) or mixtures of organopolysiloxane polymer (a).

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity. Organopolysiloxane polymer (a) is present in the composition in an amount of from 35 to 60% by weight of the composition, alternatively 35 to 55%, alternatively 40 to 55% by weight of the composition.

The reinforcing filler (b) comprises precipitated calcium carbonate having a surface area of from 2.5 to 12 m$^2$/g measured in accordance with the BET method (ISO 9277: 2010); alternatively a surface area of from 5.0 to 12 m$^2$/g measured in accordance with the BET method (ISO 9277: 2010). The precipitated calcium carbonate reinforcing filler is a hydrophobically treated precipitated calcium carbonate having particles with the above surface area and an average particle size of >0.1 μm determined using size exclusion microscopy (SEM) and image analysis. Preferably at least 75%, alternatively at least 90% of the particles are within a particle size distribution of 0.075 to 0.4 μm, alternatively a particle size distribution of 0.075 to 0.35 μm.

Typically, the reinforcing filler is present in the composition in an amount of from 30 to 60% by weight of the composition, alternatively from 35 to 60% by weight of the composition, alternatively from 35 to 60% by weight of the composition, alternatively from 40 to 60% by weight of the composition, alternatively from 40 to 56% by weight of the composition.

Reinforcing filler (b) is hydrophobically treated for example with one or more aliphatic acids, e.g. a fatty acid such as stearic acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other components. The surface treatment of the fillers makes them easily wetted by organopolysiloxane polymer (a) of the base component. These surface modified fillers do not clump and can be homogeneously incorporated into the organopolysiloxane polymer (a) of the composition. This results in improved room temperature mechanical properties of the uncured compositions. The fillers may be pre-treated or may be treated in situ when being mixed with organopolysiloxane polymer (a).

The composition herein also comprises one or more difunctional silane chain extenders having two hydroxyl or hydrolysable groups per molecule (c). The difunctional silane chain extenders (c) are utilised as cross-linkers and/or chain extenders for organopolysiloxane polymer (a). For the avoidance of doubt difunctional silane chain extenders (c) cannot contain any amine groups.

The difunctional silane chain extenders (c) may have the following structure

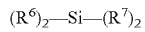

$(R^6)_2-Si-(R^7)_2$

Wherein each $R^6$ may be the same or different but is a non-functional group, in that it is unreactive with the —OH groups or hydrolysable groups of organopolysiloxane polymer (a). Hence, each $R^6$ group is selected from an alkyl group having from 1 to 10 carbon atoms, an alkenyl group, an alkynyl group or an aryl group such as phenyl. In one alternative the $R^6$ groups are either alkyl groups or alkenyl groups, alternatively there may be one alkyl group and one alkenyl group per molecule. The alkenyl group may for example be selected from a linear or branched alkenyl groups such as vinyl, propenyl and hexenyl groups and the alkyl group has from 1 to 10 carbon atoms, such as methyl, ethyl or isopropyl.

Each group $R^7$ may be the same or different and is reactable with the hydroxyl or hydrolysable groups. Examples of group $R^7$ include alkoxy, acetoxy, oxime and/or hydroxy groups Alternatively, each $R^7$ is an alkoxy group preferably containing between 1 and 10 carbon atoms, for example methoxy, ethoxy, propoxy, isoproproxy, butoxy, and t-butoxy groups.

Specific examples of suitable silanes for difunctional silane chain extenders (c) herein include, dialkyl dialkoxysilanes such as dimethyl dialkoxy silanes diethyl dialkoxy silanes, dipropyl dialkoxy silanes, methyl ethyl dialkoxy silanes, methyl propyl dialkoxy silanes or ethyl propyl dialokoxy silanes; alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, vinyl methyldiacetoxysilane, vinylethyldiacetoxysilane and alkenylalkyldihydroxysilanes such as vinyl methyl dihydroxysilane, vinyl ethyldihydroxysilane, vinyl methyldihydroxysilane and vinylethyldihydroxysilane.

The difunctional silane chain extenders (c) are present in an amount of from 0.2 to 5.0% by weight of the composition, alternatively 0.5 to 5% by weight of the composition, alternatively 1.5 to 5% by weight of the composition, alternatively in an amount of from 2.5 to 5% by weight of the composition, alternatively in an amount of from 2.5 to 4.7% by weight of the composition.

As hereinbefore described there is provided a titanate and/or zirconate catalyst (d) in an amount of from 0.2 to 1.0% by weight of the composition. The titanate and/or zirconate catalyst may comprise a compound according to the general formula $Ti[OR^9]_4$ or $Zr[OR^9]_4$ where each $R^9$ may be the same or different and represents a monovalent, primary, secondary or tertiary aliphatic hydrocarbon group which may be linear or branched containing from 1 to 10 carbon atoms. Optionally the Titanate and/or zirconate based catalysts may contain partially unsaturated groups. However, preferred examples of $R^9$ include, but are not restricted to, methyl, ethyl, propyl, isopropyl, butyl, tertiary butyl and a branched secondary alkyl group such as 2, 4-dimethyl-3-pentyl. Preferably, when each $R^9$ is the same, $R^9$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate (as well as zirconate equivalents). Alternatively, the titanate/zirconate may be chelated. The chelation may be with any suitable chelating agent such as an alkyl acetylacetonate such as methyl or ethylacetylacetonate and diisopropoxydiethylacetoacetate titanate. Alternatively, the titanate may be monoalkoxy titanates bearing three chelating agents such as for example 2-propanolato, tris isooctadecanoato titanate.

The catalyst (d) is typically present in an amount of from 0.2 to 1.0% by weight of the composition, alternatively in an amount of from 0.25 to 1.0% by weight of the composition, alternatively from 0.25 to 0.9% by weight of the composition, alternatively from 0.3% to 0.9% by weight of the composition.

The one-part condensation curable low modulus room temperature vulcanisable (RTV) silicone composition as hereinbefore described also comprises an aminosilane adhesion promoter having two hydroxyl or hydrolysable groups per molecule (e). The aminosilane adhesion promoter having two hydroxyl or hydrolysable groups per molecule adhesion promoters (e) may comprise:—

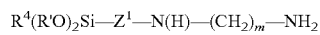

$R^4(R'O)_2Si-Z^1-N(H)-(CH_2)_m-NH_2$ in which $R^4$ is an alkyl group containing from 1 to 10 carbon atoms; each R' may be the same or different and is H or $R^4$, $Z^1$ is a linear or branched alkylene group having from 2 to 10 carbon atoms, m is from 2 to 10.

$R^4$ is an alkyl group containing from 1 to 10 carbon atoms, alternatively $R^4$ is an alkyl group containing from 1 to 6 carbon atoms, alternatively, $R^4$ is a methyl or ethyl group. Each R' may be the same or different and is each R' may be the same or different and is H or R, alternatively each R' is $R^4$. In one alternative the two R' groups are the same. When the two R' groups are the same, it is preferred that they are methyl or ethyl groups. $Z^1$ is a linear or branched alkylene group having from 2 to 10 carbons, alternatively from 2 to 6 carbons, for example $Z^1$ may be a propylene group, a butylene group or an isobutylene group. There may be from 2 to 10 m groups, in one alterative m may be from 2 to 6, in another alternative m may be from 2 to 5, in a still further alternative m may be 2 or 3, alternatively m is 2. Specific examples include but are not limited to N-(2-aminoethyl)-3-aminoisobutylmethyldimethoxysilane, N-(2-aminoethyl)-3-aminopropylmethyldimethoxysilane, N-(2-aminoethyl)-2-aminoethylmethyldimethoxysilane, N-(2-aminoethyl)-3-aminoisobutylethyldimethoxysilane, N-(2-aminoethyl)-2-aminoethylmethyldimethoxysilane, N-(2-aminoethyl)-3-aminopropylmethyldiethoxysilane, N-(2-aminoethyl)-2-aminoethylmethyldiethoxysilane, N-(2-aminoethyl)-3-aminoisobutylethyldiethoxysilane, N-(2-aminoethyl)-2-aminoethylmethyldiethoxysilane, N-(2-aminoethyl)-3-aminopropylmethylmethoxyethoxysilane, N-(2-aminoethyl)-2-aminoethylmethylmethoxyethoxysilane, N-(2-aminoethyl)-3-aminoisobutylethylmethoxyethoxysilane, N-(2-aminoethyl)-2-aminoethylmethylmethoxyethoxysilane, N-(2-aminopropyl)-3-aminoisobutylmethyldimethoxysilane, N-(2-aminopropyl)-3-aminopropylmethyldimethoxysilane, N-(2-aminopropyl)-2-aminoethylmethyldimethoxysilane, N-(2-aminopropyl)-3-aminoisobutylethyldimethoxysilane, N-(2-aminopropyl)-2-aminoethylmethyldimethoxysilane, N-(2-aminopropyl)-3-aminopropylmethyldiethoxysilane, N-(2-aminopropyl)-2-aminoethylmethyldiethoxysilane, N-(2-aminopropyl)-3-aminoisobutylethyldiethoxysilane, N-(2-aminopropyl)-2-aminoethylmethyldiethoxysilane, N-(2-aminopropyl)-3-aminopropylmethylmethoxyethoxysilane, N-(2-aminopropyl)-2-aminoethylmethylmethoxyethoxysilane, N-(2-aminopropyl)-3-aminoisobutylethylmethoxyethoxysilane and N-(2-aminopropyl)-2-aminoethylmethylmethoxyethoxysilane.

The adhesion promoter (e) is present in an amount of from 0.1 to 3.75% by weight of the composition, alternatively, in an amount of 0.1-2.5% by weight of the composition, alternatively, in an amount of 0.1-2.0% by weight of the composition, alternatively, in an amount of 0.2 to 1.0% by weight of the composition.

As previously indicated, optionally there may additionally be provided one or more silane cross-linkers having at least 3 hydroxyl and/or hydrolysable groups per molecule (f). Said one or more silane cross-linkers having at least 3 hydroxyl and/or hydrolysable groups per molecule (f), when present, may be selected from a silane having the structure

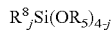

where each $R^5$ may be the same or different and is hydrogen or an alkyl group containing at least one carbons, alternatively from 1 to 20 carbons, alternatively from 1 to 10 carbons alternatively from 1 to 6 carbons. The value of j is 0 or 1. Whilst each $R^5$ group may be the same or different it is preferred that at least two $R^5$ groups are the same, alternatively at least three $R^5$ groups are the same and alternatively when j is 0 all $R^5$ groups are the same. Hence, specific examples of the reactive silane (f) when j is zero include tetraethylorthosilicate, tetrapropylorthosilicate, tetra (n-)butylorthosilicate and tetra t-butylorthosilicate.

When j is 1 the group $R^8$ is present. $R^8$ is a silicon-bonded organic group selected from a substituted or unsubstituted straight or branched monovalent hydrocarbon group having at least one carbon, a cycloalkyl group, an aryl group, an aralkyl group or any one of the foregoing wherein at least one hydrogen atom bonded to carbon is substituted by a halogen atom, or an organic group having an epoxy group, a glycidyl group, an acyl group, a carboxyl group, an ester group, an amino group, an amide group, a (meth)acryl group, a mercapto group, an isocyanurate group or an isocyanate group. Unsubstituted monovalent hydrocarbon groups, suitable as $R^8$, may include alkyl groups e.g. methyl, ethyl, propyl, and other alkyl groups, alkenyl groups such as vinyl, cycloalkyl groups may include cyclopentane groups and cyclohexane groups. Substituted groups suitable in or as $R^8$, may include, for the sake of example, 3-hydroxypropyl groups, 3-(2-hydroxyethoxy)alkyl groups, halopropyl groups, 3-mercaptopropyl groups, trifluoroalkyl groups such as 3,3,3-trifluoropropyl, 2,3-epoxypropyl groups, 3,4-epoxybutyl groups, 4,5-epoxypentyl groups, 2-glycidoxyethyl groups, 3-glycidoxypropyl groups, 4-glycidoxybutyl groups, 2-(3,4-epoxycyclohexyl) ethyl groups, 3-(3,4-epoxycyclohexyl)alkyl groups, aminopropyl groups, N-methylaminopropyl groups, N-butylaminopropyl groups, N,N-dibutylaminopropyl groups, 3-(2-aminoethoxy)propyl groups, methacryloxyalkyl groups, acryloxyalkyl groups, carboxyalkyl groups such as 3-carboxypropyl groups, 10-carboxydecyl groups.

Specific examples of suitable silane cross-linkers having at least 3 hydroxyl and/or hydrolysable groups per molecule (f), include but are not limited to vinyltrimethoxysilane, methyltrimethoxysilane, ethyltriethoxysilane, ethyltrimethoxysilane, propyltriethoxysilane, isobutyltriethoxysilane, isobutyltrimethoxysilane, vinyltriethoxysilane, phenyltriethoxysilane, phenyltrimethoxysilane, methyltris (isopropenoxy)silane or vinyltris(isopropenoxy)silane, 3-hydroxypropyl triethoxysilane, 3-hydroxypropyl trimethoxysilane, 3-(2-hydroxyethoxy)ethyltriethoxysilane, 3-(2-hydroxyethoxy)ethyltrimethoxysilane, chloropropyl triethoxysilane, 3-mercaptopropyl triethoxysilane, 3,3,3-trifluoropropyl triethoxysilane, 2,3-epoxypropyl triethoxysilane, 2,3-epoxypropyl trimethoxysilane, 3,4-epoxybutyl triethoxysilane, 3,4-epoxybutyl trimethoxysilane, 4,5-epoxypentyl triethoxysilane, 4,5-epoxypentyl trimethoxysilane, 2-glycidoxyethyl triethoxysilane, 2-glycidoxyethyl trimethoxysilane, 3-glycidoxypropyl triethoxysilane, 3-glycidoxypropyl trimethoxysilane, 4-glycidoxybutyl triethoxysilane, 4-glycidoxybutyl trimethoxysilane, 2-(3,4-epoxycyclohexyl) ethyl triethoxysilane, 3-(3,4-epoxycyclohexyl)ethyl triethoxysilane, aminopropyl triethoxysilane, aminopropyl trimethoxysilane, N-methylaminopropyl triethoxysilane, N-methylaminopropyl trimethoxysilane, N-butylaminopropyl trimethoxysilane, N,N-dibutylaminopropyl triethoxysilane, 3-(2-aminoethoxy)propyl triethoxysilane, methacryloxypropyl triethoxysilane, tris(3-triethoxysilylpropyl) isocyanurate, acryloxypropyl triethoxysilane, 3-carboxypropyl triethoxysilane and 10-carboxydecyl triethoxysilane.

The one or more silane cross-linkers having at least 3 hydroxyl and/or hydrolysable groups per molecule (f) is present in an amount of from 0 to 3% by weight of the composition, when present it may be present in an amount of from 0.1 to 2% by weight of the composition, alternatively in an amount of from 0.25 to 1.5% by weight of the composition, alternatively in an amount of from 0.25 to 1.0% by weight of the composition.

Optional additives may be used if necessary. These may include non-reinforcing fillers, pigments, rheology modifiers, cure modifiers, and fungicides and/or biocides and the like; It will be appreciated that some of the additives are included in more than one list of additives. Such additives would then have the ability to function in all the different ways referred to.

Non-reinforcing fillers, which might be used alone or in addition to the above include aluminite, calcium sulphate (anhydrite), gypsum, nepheline, svenite, quartz, calcium sulphate, magnesium carbonate, clays such as kaolin, ground calcium carbonate, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$.

The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate ester, stearic acid, salts of stearic acid, calcium stearate and carboxylatepolybutadiene. Treating agents based on silicon containing materials may include organosilanes, organosiloxanes, or organosilazanes hexaalkyl disilazane or short chain siloxane diols to render the filler(s) hydrophobic and therefore easier to handle and obtain a homogeneous mixture with the other sealant components. The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The composition of the invention can also include other ingredients known for use in moisture curable compositions based on silicon-bonded hydroxyl or hydrolysable groups such as sealant compositions.

Pigments are utilized to color the composition as required. Any suitable pigment may be utilized providing it is compatible with the composition. When present, carbon black will function as both a non-reinforcing filler and colorant and is present in a range of from 1 to 30% by weight of the catalyst package composition, alternatively from 1 to 20% by weight of the catalyst package composition; alternatively, from 5 to 20% by weight of the catalyst package composition, alternatively from 7.5 to 20% by weight of the catalyst composition.

Rheology modifiers which may be incorporated in one-part condensation curable low modulus room temperature vulcanisable (RTV) silicone compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Biocides may additionally be utilized in the one-part condensation curable low modulus room temperature vulcanisable (RTV) silicone composition if required. It is intended that the term "biocides" includes bactericides, fungicides and algicides, and the like. Suitable examples of useful biocides, which may be utilized in compositions as described herein, include, for the sake of example: Carbamates such as methyl-N-benzimidazol-2-ylcarbamate (carbendazim) and other suitable carbamates, 10,10′-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

The fungicide and/or biocide may suitably be present in an amount of from 0 to 0.3% by weight of the one-part condensation curable low modulus room temperature vulcanisable (RTV) silicone composition and may be present in an encapsulated form where required such as described in EP2106418.

Hence, the one-part condensation curable low modulus room temperature vulcanisable (RTV) silicone composition herein may comprise (a) an organopolysiloxane polymer having at least two hydroxyl or hydrolysable groups per molecule of the formula $$X_{3-n}R_nSi-(Z)_d-(O)_q-(R^1{}_ySiO_{(4-y)/2})_z-(SiR^1{}_2-Z)_d-Si-R_nX_{3-n} \qquad (1)$$

in which each X is independently a hydroxyl group or a hydrolysable group, each R is an alkyl, alkenyl or aryl group, each $R^1$ is X group, alkyl group, alkenyl group or aryl group and Z is a divalent organic group;
d is 0 or 1, q is 0 or 1 and d+q=1; n is 0, 1, 2 or 3, y is 0, 1 or 2, and preferentially 2 and z is an integer such that said organopolysiloxane polymer has a viscosity of from 30,000 to 80,000 mPa·s at 25° C., alternatively from 40,000 to 75,000 mPa·s at 25° C., in an amount of from 35 to 60% by weight of the composition, alternatively, 35 to 55%, alternatively, 40 to 55% by weight of the composition;

(b) a hydrophobically treated calcium carbonate reinforcing filler a hydrophobically treated calcium carbonate reinforcing filler having a surface area of from 2.5 to 12 m²/g measured in accordance with the BET method (ISO 9277: 2010); and an average particle size of >0.1 μm determined using size exclusion microscopy (SEM) and image analysis in an amount of 30 to 60% by weight of the composition; alternatively, from 35 to 60% by weight of the composition, alternatively from 35 to 60% by weight of the composition, alternatively from 40 to 60% by weight of the composition, alternatively from 40 to 56% by weight of the composition;

(c) one or more difunctional silane chain extenders having two hydroxyl or hydrolysable groups per molecule in an amount of from 0.5 to 5.0% by weight of the composition, alternatively, of from 1.5 to 5% by weight of the composition, alternatively in an amount of from 2.5 to 5% by weight of the composition, alternatively in an amount of from 2.5 to 4.7% by weight of the composition;

(d) a titanate and/or zirconate catalyst in an amount of from 0.2 to 1.0% by weight of the composition, alternatively, 0.25 to 1.0% by weight of the composition, alternatively from 0.25 to 0.9% by weight of the composition, alternatively from 0.3% to 0.9% by weight of the composition;

(e) an aminosilane adhesion promoter having two hydroxyl or hydrolysable groups per molecule in an amount of 0.1-3.75% by weight of the composition, alternatively, in an amount of 0.1-2.5% by weight of the composition, alternatively, in an amount of 0.20 to 1.0% by weight of the composition; and optionally (f) one or more silane cross-linkers having at least 3 hydroxyl and/or hydrolysable groups per molecule in an amount of from 0 to 3% by weight of the composition, when present it may be present in an amount of from 0.1 to 2% by weight of the composition, alternatively in an amount of from 0.25 to 1.5% by weight of the composition, alternatively in an amount of from 0.25 to 1.0% by weight of the composition.

The total composition of ingredients (a) to (f) together with any other optional ingredients included in the composition has a value of 100% by weight.

The ingredients and their amounts are designed to provide a one-part condensation curable low modulus room temperature vulcanisable (RTV) silicone composition which provides improved adhesion compared to previous composition and that the resulting sealant upon cure will be non-staining. (clean) given the lack of plasticisers. Low modulus silicone sealant compositions are preferably "gunnable" i.e. they have a suitable extrusion capability i.e. a minimum extrusion rate of 10 ml/min as measured by ASTM C1183-04, alternatively 10 to 1000 mL/min, and alternatively 100 to 1000 mL/min.

The ingredients and their amounts in the sealant composition are selected to impart a movement capability to the post-cured sealant material. The movement capability is greater than 25%, alternatively movement capability ranges from 25% to 50%, as measured by ASTM C719-13.

A one-part condensation curable low modulus room temperature vulcanisable (RTV) silicone composition as hereinbefore described may be a gunnable sealant composition used for
(i) space/gap filling applications;
(ii) seal applications, such as sealing the edge of a lap joint in a construction membrane; or
(iii) seal penetration applications, e.g., sealing a vent in a construction membrane;
(iv) adhering at least two substrates together.
(v) a laminating layer between two substrates to produce a laminate of the first substrate, the sealant product and the second substrate.

In the case of (v) above when used as a layer in a laminate, the laminate structure produced is not limited to these three layers. Additional layers of cured sealant and substrate may be applied. The layer of gunnable sealant composition in the laminate may be continuous or discontinuous.

A one-part condensation curable low modulus room temperature vulcanisable (RTV) silicone composition as hereinbefore described may be applied on to any suitable substrate. Suitable substrates may include, but are not limited to, glass; concrete; brick; stucco; metals, such as aluminium, copper, gold, nickel, silicon, silver, stainless steel alloys, and titanium; ceramic materials; plastics including engineered plastics such as epoxies, polycarbonates, poly(butylene terephthalate) resins, polyamide resins and blends thereof, such as blends of polyamide resins with syndiotactic polystyrene such as those commercially available from The Dow Chemical Company, of Midland, Mich., U.S.A., acrylonitrile-butadiene-styrenes, styrene-modified poly(phenylene oxides), poly(phenylene sulfides), vinyl esters, polyphthalamides, and polyimides; cellulosic substrates such as paper, fabric, and wood; and combinations thereof. When more than one substrate is used, there is no requirement for the substrates to be made of the same material. For example, it is possible to form a laminate of plastic and metal substrates or wood and plastic substrates. After application and cure the elastomeric sealant product is non-staining (clean) with respect to porous substrates like granite, limestone, marble, masonry, metal and composite panels. This is at least partially because the composition does not require a diluent such as an unreactive plasticiser or extender in the composition.

In the case of one-part condensation curable low modulus room temperature vulcanisable (RTV) silicone compositions as hereinbefore described, there is provided a method for filling a space between two substrates so as to create a seal therebetween, comprising:
a) providing a one-part condensation curable low modulus room temperature vulcanisable (RTV) silicone composition as hereinbefore described, and either
b) applying the silicone composition to a first substrate, and bringing a second substrate in contact with the silicone composition that has been applied to the first substrate, or
c) filling a space formed by the arrangement of a first substrate and a second substrate with the silicone composition and curing the silicone composition.

The one-part condensation curable low modulus room temperature vulcanisable (RTV) silicone composition as hereinbefore described provides a low modulus silicone sealant which substantially plasticiser free, has high movement capabilities and is non-staining (clean) on construction substrates which may or may not be porous, such as granite, limestone, marble, masonry, glass, metal and composite panels for use as a stain-resistant weather sealing sealant material for construction and the like applications.

The Low modulus nature of the silicone elastomer produced upon cure of the composition described herein makes the elastomer effective at sealing joints which may be subjected to movement for any reason, because compared to other cured sealants (with standard or high modulus) lower forces are generated in the cured sealant body and transmitted by the sealant to the substrate/sealant interface due to expansion or contraction of the joint enabling the cured sealant to accommodate greater joint movement without failing cohesively or interfacially (adhesively) or cause substrate failure.

EXAMPLES

The polymer viscosities mentioned were performed in accordance with Corporate test method CTM 0050, which is publicly available, and which is based on ASTM D 1084-16 method B, using a Brookfield HBDV-III Ultra Rheometer equipped with a cone-and-plate geometry using spindle 52. at room temperature (about 25° C.). The tests in accordance with ASTM D412-16 used dumbbell test pieces. The compositions were all prepared in a dental mixer using the following process at room temperature and pressure, unless otherwise indicated.

The ethylene trimethoxysilyl-terminated polydimethylsiloxane was first introduced into the mixer and was stirred and then the remaining ingredients were added and the composition was thoroughly mixed at each stage to generate the final composition.

The one-part silicone sealant composition was prepared to the formulations below in Tables 1a and 1b using a suitable mixer e.g. a Semco mixer in the amounts indicated. Several examples were prepared utilizing N-(2-aminoethyl)-3-aminoisobutylmethyldimethoxysilane as adhesion promoter, these are depicted in Table 1a.

TABLE 1a

| Composition of Examples 1-5 (weight %) | | | | | |
|---|---|---|---|---|---|
| Ingredient Type | Ex. 1 | Ex. 2 | Ex. 3 | Ex. 4 | Ex. 5 |
| Ethylene trimethoxysilyl-terminated polydimethylsiloxane having a viscosity of about 65,000 mPa.s Polymer | 46.89 | 44.50 | 46.72 | 46.72 | 46.72 |
| Vinylmethyldimethoxysilane | 3.41 | 3.41 | 3.41 | 3.41 | 3.92 |
| methyltrimethoxysilane | | 0.35 | 0.35 | 0.35 | 0.35 |
| N-(2-aminoethyl)-3-aminoisobutylmethyldimethoxysilane | 0.34 | 0.34 | 0.43 | 0.34 | 0.29 |
| Titanium tetra-tert-butoxide | 0.60 | 0.60 | 0.60 | 0.45 | 0.51 |

TABLE 1a-continued

Composition of Examples 1-5 (weight %)

| Ingredient Type | Ex. 1 | Ex. 2 | Ex. 3 | Ex. 4 | Ex. 5 |
|---|---|---|---|---|---|
| Treated precipitated calcium carbonate 1 | 48.40 | 50.44 | 48.13 | 48.46 | 47.90 |
| Methylacetoacetate | 0.36 | 0.36 | 0.36 | 0.27 | 0.31 |
| | 100 | 100 | 100 | 100 | 100 |

A series of comparatives using alternative adhesion promoters but otherwise the same general sealant compositions were also prepared using the compositions depicted in Table 1b. Treated precipitated calcium carbonate 1 has a surface area (BET method) of 9.8 m²/g and an average particle size determined by size exclusion microscopy (SEM) and image analysis of about 0.15 μm.

TABLE 1b

Composition of Comparative Examples C1-C3 (weight %)

| Ingredient | C1 | C2 | C3 |
|---|---|---|---|
| Ethylene trimethoxysilyl-terminated polydimethylsiloxane having a viscosity of about 65,000 mPa.s | 44.50 | 44.50 | 44.50 |
| Vinylmethyldimethoxysilane | 3.41 | 3.41 | 3.41 |
| methyltrimethoxysilane | 0.35 | 0.35 | 0.35 |
| N-(2-aminoethyl)-3-aminopropyltrimethoxysilane | | | 0.34 |
| Adhesion Promoter 2 | | 0.34 | |
| bis (3-trimethoxysilylpropyl)amine | 0.34 | | |
| Titanium tetra-tert-butoxide | 0.60 | 0.60 | 0.60 |
| Treated precipitated calcium carbonate 1 | 50.44 | 50.44 | 50.44 |
| Methylacetoacetate | 0.36 | 0.36 | 0.36 |
| Total | 100 | 100 | 100 |

Adhesion Promoter 2 was the reaction product of trimethoxymethylsilane; 3-aminopropyl trimethoxysilane and glycidoxypropyl trimethoxysilane. Regarding the comparative adhesion promoters, N-(2-aminoethyl)-3-aminopropyltrimethoxysilane is very similar to N-(2-aminoethyl)-3-aminoisobutylmethyldimethoxysilane in structure, but the former has a propyl group as opposed to an isobutyl group and is a trifunctional silane as opposed to a difunctional silane. The bis (3-trimethoxysilylpropyl)amine has two trifunctional silane groups. Adhesion Promoter 2 is a reaction product of a mixture of amino silanes and epoxide silanes.

All the compositions were mixed in the same manner and cured for twenty one days before testing unless otherwise indicated. Test pieces were then utilised to assess physical properties.

Tensile Strength, elongation and modulus at 100% extension were measured using ASTM D412-16, test method A. A 75 mL of slab material was drawn down on a polyethylene film and cured for 21 days at room temperature. Dumbbell test pieces (sometimes referred to as "Dogbones") were cut using die DIN S2 and pulled on MTS Systems Corp Alliance RT/5 Testing Machine at 50.8 cm/min using 100 N load cell. Data was collected and analyzed using Test Works Elite V 4.3.1 Software systems. The results are an average of three dumbbells per slab. Shore A durometer tests were made in accordance with ASTM D2240-15. The results are depicted in Tables 2a, 2b and 2c.

TABLE 2a

Durometer, tensile strength and elongation for the comparative and inventive examples.

| | C1 | C2 | C3 | Ex. 1 | Ex. 2 | Ex. 3 | Ex. 4 | Ex. 5 |
|---|---|---|---|---|---|---|---|---|
| Durometer (Sh. A) | 42 | 38 | 34 | 27 | 30 | 29 | 28 | 29 |

TABLE 2a-continued

Durometer, tensile strength and elongation for the comparative and inventive examples.

|  | C1 | C2 | C3 | Ex. 1 | Ex. 2 | Ex. 3 | Ex. 4 | Ex. 5 |
|---|---|---|---|---|---|---|---|---|
| Tensile Strength (MPa) | 1.93 | 1.92 | 2.27 | 1.6 | 2.01 | 2.37 | 2.09 | 2.03 |
| Elongation (%) | 743 | 911 | 1158 | 1387 | 1251 | 1408 | 1443 | 1264 |

TABLE 2b

Modulus results at specific Extensions for Examples 1 to 5 (ASTM D 412-16)

|  | Ex. 1 | Ex. 2 | Ex. 3 | Ex. 4 | Ex. 5 |
|---|---|---|---|---|---|
| Modulus (MPa) at an extension of 12.5% | 0.18 | 0.17 | 0.19 | 0.17 | 0.20 |
| Modulus (MPa) at an extension of 25% | 0.24 | 0.25 | 0.27 | 0.24 | 0.27 |
| Modulus (MPa) at an extension of 50% | 0.30 | 0.32 | 0.34 | 0.32 | 0.34 |
| Modulus (MPa) at an extension of 100% | 0.36 | 0.39 | 0.41 | 0.39 | 0.42 |
| Modulus (MPa) at an extension of 150% | 0.39 | 0.44 | 0.45 | 0.44 | 0.46 |
| Modulus (MPa) at an extension 200% | 0.42 | 0.48 | 0.49 | 0.48 | 0.50 |

TABLE 2c

Stress results at specific Strains for Comparatives 1 to 3 (ASTM D 412-16)

|  | C1 | C2 | C3 |
|---|---|---|---|
| Modulus (MPa) at an extension of 12.5% | 0.25 | 0.28. | 0.23 |
| Modulus (MPa) at an extension 25% | 0.40 | 0.35 | 0.32 |
| Modulus (MPa) at an extension of 50% | 0.53 | 0.45 | 0.41 |
| Modulus (MPa) at an extension of 100% | 0.69 | 0.55 | 0.5 |
| Modulus (MPa) at an extension of 150% | 0.81 | 0.63 | 0.56 |
| Modulus (MPa) at an extension of 200% | 0.90 | 0.69 | 0.61 |

It may be appreciated from Tables 2b and 2c that the lowest modulus can be obtained with the inventive example.

Peel strength or Adhesion-in-peel results were tested according to ASTM C794-18 with the following modifications. The stainless-steel screens were cleaned with xylene and primed using DOWSIL™ 1200 OS primer. The substrates were cleaned using isopropanol and allowed to dry. No tape was used to make the peel but any excess along the screen was cut using a knife and trimmed to 1.27 cm width before pulling. The samples were pulled on a tensiometer (Instron or MTS Alliance RT/5, Texture Analyzer), at a rate of 5.08 cm/min for a distance of 2.54 cm. The data reported are after 21 days cure at room temperature. It was deemed that a peel strength to any substrate was sufficiently strong if it was ≥3.0 kN/m and the modulus at 100% extension was deemed acceptable if in the range of 0.207-0.448 MPa. All the examples shown above passed all of these criteria but only the result of Ex. 2 is shown in the results Tables 3a merely as improvements.

TABLE 3a

Peel strength or Adhesion-in-peel results for Ex. 2 and C1-C3 on glass, anodized aluminum, brick, and fluoropolymer coating.

|  |  | Examples | | | |
|---|---|---|---|---|---|
| Substrates |  | C1 | C2 | C3 | Ex. 2 |
| Glass | (kN/m) | 5.19 | 8.34 | 8.96 | 5.17 |
|  | std dev | 0.18 | 0.46 | 0.70 | 0.47 |

TABLE 3a-continued

Peel strength or Adhesion-in-peel results for Ex. 2 and C1-C3 on glass, anodized aluminum, brick, and fluoropolymer coating.

|  |  | Examples | | | |
|---|---|---|---|---|---|
| Substrates |  | C1 | C2 | C3 | Ex. 2 |
| Anodized aluminum | (kN/m) | 1.88 | 3.17 | 4.73 | 4.89 |
|  | std dev | 0.11 | 0.25 | 0.49 | 0.39 |
| Brick | (kN/m) | 6.63 | 7.78 | 6.91 | 4.47 |
|  | std dev | 0.60 | 0.49 | 1.93 | 2.07 |
| Fluoropolymer coating | (kN/m) | 0.00 | 1.00 | 0.82 | 3.70 |
|  | std dev | 0.00 | 0.09 | 0.07 | 0.19 |

Based on the criteria set only the Example 2 results in Table 3a were good enough to pass every criteria, the comparatives were only partially successful. As shown, the comparative compositions only passed some. The passing of the criteria based on the results in Table 3a above is indicated by the ticks shown in Table 3b below.

TABLE 3b

| Measurements | Criteria | C1 | C2 | C3 | Ex. 2 |
|---|---|---|---|---|---|
| Adhesion to glass | 3.0 kN/m | ✓ | ✓ | ✓ | ✓ |
| Adhesion to brick | 3.0 kN/m | ✓ | ✓ | ✓ | ✓ |
| Adhesion to anodized aluminum | 3.0 kN/m |  |  | ✓ | ✓ |
| Adhesion to fluoropolymer coating | 3.0 kN/m |  |  |  | ✓ |
| 100% Modulus | 0.207-0.448 MPa |  |  |  | ✓ |

Only Ex. 2 was found to have a consistent adhesion profile for the 4 tested substrates when compared with the 3 comparative examples. For one-part silicone sealant compositions utilizing titanate and/or zirconate catalysts, adhesion to both brick and fluoropolymer coating is challenging and was demonstrated successfully only when using a dimethoxy silane such as N-(2-aminoethyl)-3-aminoisobutylmethyldimethoxysilane as the adhesion promoter.

The one-part condensation curable low modulus room temperature vulcanisable (RTV) silicone compositions as hereinbefore described gave much better results than the comparatives using alternative adhesion promoters.

A further set of the Examples Ex. 1 to Ex. 5 were prepared and cured and tested as described above with respect to Peel strength or Adhesion-in-peel on different substrates to show that the adhesion of these compositions is functioning on other substrates as well as those given previously. They were specifically tested on porous stones substrates as well as a fluoropolymer coated substrate all of which are known to be problematic to adhere to for these types of sealant compositions. Testing was undertaken as described above and the same criteria was relied on with respect to whether adhesion was successful or not. The results are depicted in Table. 4a below and the criteria passed is shown in Table 4b.

TABLE 4a

Peel strength or Adhesion-in-peel results for Examples Ex. 1 to Ex. 5 on brick, marble, fluoropolymer coating, and limestone.

| Substrates | | Examples | | | | |
|---|---|---|---|---|---|---|
| | | Ex. 1 | Ex. 2 | Ex. 3 | Ex. 4 | Ex. 5 |
| Brick | kN/m | 6.24 | 4.21 | 5.52 | 4.31 | 5.75 |
| | Std Dev | 0.33 | 0.39 | 0.28 | 0.26 | 0.44 |
| Marble | kN/m | 2.23 | 3.23 | 5.05 | 5.73 | 2.86 |
| | Std Dev | 0.05 | 0.14 | 0.68 | 0.32 | 0.07 |
| Fluoropolymer coating | kN/m | 3.49 | 3.93 | 3.82 | 3.14 | 4.36 |
| | Std Dev | 0.27 | 0.16 | 0.11 | 0.10 | 0.23 |
| Limestone | kN/m | 3.77 | 3.45 | 3.07 | 4.00 | 3.44 |
| | Std Dev | 0.23 | 0.09 | 0.18 | 0.24 | 0.12 |

TABLE 4b

| Measurements | Criteria | Ex. 1 | Ex. 2 | Ex. 3 | Ex. 4 | Ex. 5 |
|---|---|---|---|---|---|---|
| Adhesion to brick | 3.0 kN/m | ✓ | ✓ | ✓ | ✓ | ✓ |
| Adhesion to marble | 3.0 kN/m | ✗ | ✓ | ✓ | ✓ | ✗ |
| Adhesion to fluoropolymer coating | 3.0 kN/m | ✓ | ✓ | ✓ | ✓ | ✓ |
| Adhesion to limestone | 3.0 kN/m | ✓ | ✓ | ✓ | ✓ | ✓ |
| 100% Modulus | 0.207-0.448 MPa | ✓ | ✓ | ✓ | ✓ | ✓ |

It will be seen that peel strength or adhesion-in-peel results with the exception of composition Ex. 2 on marble passed.

The compositions above all used treated precipitated calcium carbonate 1 as the filler. It was decided to compare results of such formulations, exemplified here in Table. 5 by Ex. 2 again, with some precipitated calcium carbonate fillers commonly used in silicone sealant formulations. Comparative 4 utilised Ultra-PFLEX® precipitated calcium carbonate and comparative 5 utilised Winnofil®SPM precipitated calcium carbonate as shown in Table 5 below.

TABLE 5

Composition of Comparative Examples 4 and 5 (weight %)

| Ingredient Type | C4 (wt. %) | C5 (wt. %) |
|---|---|---|
| Ethylene trimethoxysilyl-terminated polydimethylsiloxane having a viscosity of about 65,000 mPa.s | 44.5 | 44.5 |
| Vinylmethyldimethoxysilane | 3.41 | 3.41 |
| methyltrimethoxysilane | 0.35 | 0.35 |

TABLE 5-continued

Composition of Comparative Examples 4 and 5 (weight %)

| Ingredient Type | C4 (wt. %) | C5 (wt. %) |
|---|---|---|
| N-(2-aminoethyl)-3-aminoisobutylmethyldimethoxysilane | 0.34 | 0.34 |
| Titanium tetra-tert-butoxide | 0.60 | 0.60 |
| Ultra-PFLEX® precipitated calcium carbonate | 50.44 | |
| Winnofil® SPM precipitated calcium carbonate | | 50.44 |
| treated precipitated calcium carbonate 1 | | |
| Methylacetoacetate | 0.36 | 0.36 |

Ultra-PFLEX® precipitated calcium carbonate is a commonly used hydrophobically treated precipitated calcium carbonate in silicone sealant compositions from Specialty Minerals having an average particle size of about 0.07 m (supplier information test method not supplied) and a surface area of about 21 m²/g (supplier information test method not supplied). Winnofil®SPM is a commonly used hydrophobically treated precipitated calcium carbonate is another commonly used precipitated calcium carbonate in silicone sealant compositions from Imerys having an average particle size of <0.1 μm (supplier information test method not supplied) and a surface area of from about 15 to 24 m²/g (BET Method), no further details provided.

The comparative examples therefore have higher surface areas and lower particle sizes than treated precipitated calcium carbonate 1 used in all the above examples and comparatives.

The compositions were prepared in an analogous fashion to those described above and were cured for 21 days before they were tested for their physical properties.

TABLE 6a

Durometer, tensile, elongation and stress at different strain for the comparative and inventive examples using different fillers.

| | C4 | C5 | Ex. 2 |
|---|---|---|---|
| Durometer (Sh. A) | 44 | 53 | 33 |
| Tensile (MPa) | 3.16 | 3.57 | 1.82 |
| Elongation (%) | 895 | 775 | 1194 |

TABLE 6b

Stress results at specific Strains for comparatives 4 and 5 compared to Ex. 2

| | C4 | C5 | Ex. 2 |
|---|---|---|---|
| Modulus (MPa) at an extension of 12.5% | 0.26 | 0.36 | 0.20 |
| Modulus (MPa) at an extension of 25% | 0.38 | 0.55 | 0.28 |
| Modulus (MPa) at an extension of 50% | 0.53 | 0.77 | 0.36 |
| Modulus (MPa) at an extension of 100% | 0.78 | 1.10 | 0.43 |
| Modulus (MPa) at an extension of 150% | 1.00 | 1.38 | 0.46 |
| Modulus (MPa) at an extension of 200% | 1.20 | 1.65 | 0.50 |

It will be appreciated that Ex. 2 had a much lower modulus.

Peel strength or Adhesion-in-peel results were tested according to ASTM C794-18 with the same modifications as described above. The resulting Peel strength or Adhesion-in-peel values are provided in Table 7a below with an indication of successfully passing the criteria identified indicated in Table 7b.

TABLE 7a

Peel strength or Adhesion-in-peel results for C4 and C5 compared to Ex. 2 on glass, anodized aluminum, brick, and fluoropolymer coating.

| Substrates | | C4 | C5 | Ex. 2 |
|---|---|---|---|---|
| Glass | (kN/m) | 13.3 | 12.4 | 9.1 |
| | std dev | 1.9 | 3.0 | 1.5 |
| Anodized aluminum | (kN/m) | 15.6 | 16.4 | 9.9 |
| | std dev | 2.0 | 1.6 | 1.1 |
| Brick | (kN/m) | 6.0 | 2.4 | 5.2 |
| | std dev | 1.6 | 0.1 | 0.6 |
| Fluoropolymer coating | (kN/m) | 2.3 | 1.3 | 4.4 |
| | std dev | 0.2 | 0.1 | 0.6 |

TABLE 7b

| Measurements | Criteria | C4 | C5 | Ex. 2 |
|---|---|---|---|---|
| Adhesion to glass | 3.5 kN/m | ✓ | ✓ | ✓ |
| Adhesion to Anodized Aluminum | 3.5 kN/m | ✓ | ✓ | ✓ |
| Adhesion to brick | 3.5 kN/m | ✓ | | ✓ |
| Adhesion to Fluoropolymer coating | 3.5 kN/m | | | ✓ |
| 100% Modulus | 0.207-0.448 MPa | | | ✓ |

It will be appreciated that the only composition out of C4, C5 and Ex. 2, used here as an example of the disclosure herein, which results in a low modulus sealant is Ex. 1. It will also be appreciated that comparing these comparatives with Ex. 2 it can be seen Ex. 1 had a comparatively good/consistent adhesion profile.

What is claimed is:

1. A one-part condensation curable low modulus room temperature vulcanisable (RTV) silicone composition comprising:
(a) an organopolysiloxane polymer having at least two hydroxyl or hydrolysable groups per molecule and of the general formula $$X_{3-n}R_nSi-(Z)_d-(O)_q-(R^1{}_ySiO_{(4-y)/2})_z-(SiR^1{}_2-Z)_d-Si-R_nX_{3-n} \quad (1)$$

in which each X is independently a hydroxyl group or a hydrolysable group, each R is an alkyl, alkenyl or aryl group, each $R^1$ is an X group, alkyl group, alkenyl group or aryl group and Z is a divalent organic group; d is 0 or 1, q is 0 or 1 and (d+q)=1; n is 0, 1, 2 or 3, y is 0, 1 or 2, or optionally y is 2, and z is an integer such that organopolysiloxane polymer (a) has a viscosity of from 30,000 to 80,000 mPa·s at 25° C., or optionally from 40,000 to 75,000 mPa·s at 25° C., in an amount of from 35 to 60% by weight of the composition;
(b) a hydrophobically treated calcium carbonate reinforcing filler having a surface area of from 2.5 to 12 m²/g and an average particle size of >0.1 μm, in an amount of from 30 to 60% by weight of the composition;
(c) one or more difunctional silane chain extenders having two hydroxyl or hydrolysable groups per molecule, in an amount of from 0.2 to 5% by weight of the composition;
(d) a titanate and/or zirconate catalyst, in an amount of from 0.2 to 1.0% by weight of the composition; and
(e) an aminosilane adhesion promoter having two hydroxyl or hydrolysable groups per molecule, in an amount of from 0.1 to 3.75% by weight of the composition; and optionally, further comprising:
(f) one or more silane cross-linkers having at least three hydroxyl and/or hydrolysable groups per molecule, in an amount of from 0 to 3% by weight of the composition.

2. The one-part room temperature vulcanisable (RTV) silicone composition in accordance with claim 1, wherein organopolysiloxane polymer (a) is of the general formula $$X_{3-n}R_nSi-(Z)-(R^1{}_ySiO_{(4-y)/2})_z-(SiR^1{}_2-Z)-SiR_nX_{3-n}$$

wherein n is 0 or 1, each of R, Z, $R^1$, y, and z is as defined above, and each X is an alkoxy group.

3. The one-part room temperature vulcanisable (RTV) silicone composition in accordance with claim 1, wherein the reinforcing filler (b) comprises a hydrophobically treated precipitated calcium carbonate having a surface area of from 5.0 to 12 m²/g and an average particle size of >0.1 μm.

4. The one-part room temperature vulcanisable (RTV) silicone composition in accordance with claim 1, wherein the reinforcing filler (b) comprises a hydrophobically treated precipitated calcium carbonate wherein at least 75% of the particles are within a particle size distribution of 0.075 to 0.4 μm.

5. The one-part room temperature vulcanisable (RTV) silicone composition in accordance with claim 1, wherein the aminosilane adhesion promoter (e) is of the general formula $$R^4(R'O)_2Si-Z^1-N(H)-(CH_2)_mNH_2$$

in which $R^4$ is an alkyl group containing from 1 to 10 carbon atoms; each R' is the same or different and is H or $R^4$, $Z^1$ is a linear or branched alkylene group having from 2 to 10 carbon atoms, and m is from 2 to 10.

6. The one-part room temperature vulcanisable (RTV) silicone composition in accordance with claim 1, wherein the aminosilane adhesion promoter (e) is N-(2-aminoethyl)-3-aminoisobutylmethyldimethoxysilane.

7. The one-part room temperature vulcanisable (RTV) silicone composition in accordance with claim 1, which is gunnable and/or self-levelling.

8. The one-part room temperature vulcanisable (RTV) silicone composition in accordance with claim 1, capable of being applied as a paste to a joint between two adjacent substrate surfaces where it can be worked, prior to curing, to provide a smooth surfaced mass which will remain in its allotted position until it has cured into an elastomeric body adherent to the adjacent substrate surfaces.

9. A silicone elastomer which is the reaction product of the one-part room temperature vulcanisable (RTV) silicone composition in accordance with claim 1.

10. The silicone elastomer in accordance with claim 9, which upon cure provides a sealant with a low modulus of ≤0.45 MPa at 100% elongation.

11. The silicone elastomer in accordance with claim 9, which is non-staining.

12. A method of making the one-part room temperature vulcanisable (RTV) silicone composition in accordance with claim 1, the method comprising mixing all of the ingredients together.

13. A sealant suitable for use in the facade, insulated glass, window construction, automotive, solar and construction fields, wherein the sealant comprises or is formed from the one-part room temperature vulcanisable (RTV) silicone composition in accordance with claim 1.

14. A sealant comprising or formed from the one-part room temperature vulcanisable (RTV) silicone composition in accordance with claim 1.

15. A method for filling a space between two substrates so as to create a seal therebetween, the method comprising:
   a) providing the one-part room temperature vulcanisable (RTV) silicone composition in accordance with claim 1, and either b) or c);
   b) applying the silicone composition to a first substrate, and bringing a second substrate in contact with the silicone composition that has been applied to the first substrate, or
   c) filling a space formed by the arrangement of a first substrate and a second substrate with the silicone composition and curing the silicone composition.

16. The method for filling a space between two substrates in accordance with claim 15, wherein the space is filled by introducing the silicone composition by way of extrusion or through a sealant gun.

\* \* \* \* \*